Nov. 19, 1929.    J. B. GRIFFITH    1,736,119
LENS MOUNTING
Filed April 13, 1927
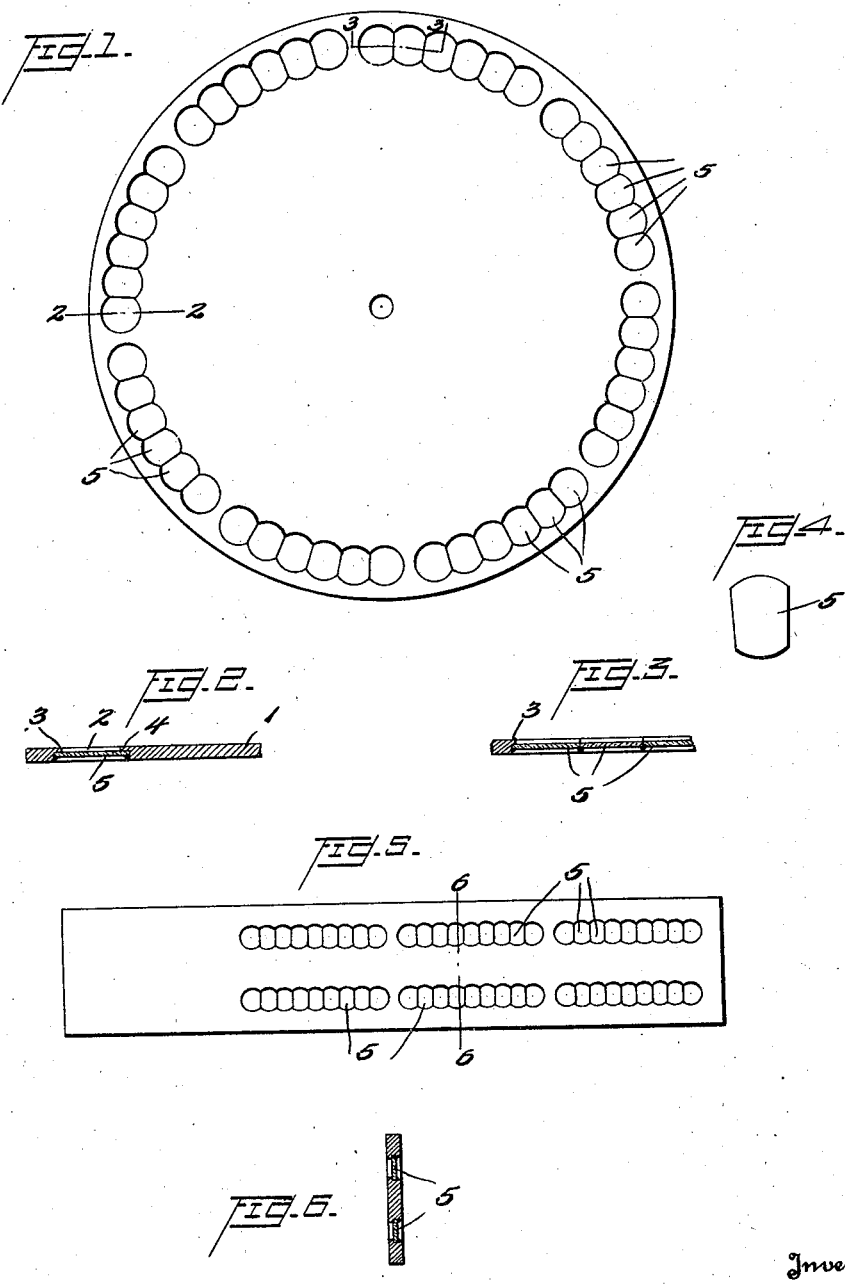
Inventor
J. B. Griffith
By Wolfe & Littlehales
Attorneys Patented Nov. 19, 1929

1,736,119

UNITED STATES PATENT OFFICE

JAMES BEATY GRIFFITH, OF WASHINGTON, DISTRICT OF COLUMBIA

LENS MOUNTING

Application filed April 13, 1927. Serial No. 183,389.

This invention relates to lens mounting for optical instruments, and more particularly to the mounting of lenses in optometers and like instruments used in determining errors in eyesight, and it comprises a series of lenses having substantially straight side edges, mounted in a support in abutting relation whereby the distance from the edge of each lens to its center is decreased, but without altering the strength and accuracy of the lenses, to thereby decrease the amount of initial prismic displacement and the duration time of the prismic displacement.

Optometers as at present manufactured comprise, essentially, a rotary disc which carries a number of plus and minus spherical lenses mounted around its periphery. Such discs must be of relatively small diameter in order that the instrument be not unwieldy, and, consequently, with discs of small diameter it has been found impossible to mount more than a small number of the lenses necessary for a proper examination. In the past it has been the practice to provide a circular disc of convenient size with a limited number of separate, spaced and uniform sized circular apertures, and to mount in such apertures a series of spherical lenses of progressively increasing strength, beginning with diopter strength +1.00 or −1.00 and continuing in diopter integers to the desired strength for making examination.

In order to provide, between these strengths, the fractional strengths so often desired in an examination of the human eye a second lens carrier is provided containing uniform spaced and sized apertures in which are mounted plus and minus spherical lenses of fractions of a diopter strength. By passing these supplemental fractional power lenses in front of any one of those of integral power a second lens strength can be produced, this strength being either greater or less than that of the integral power lens, depending upon whether the supplemental carrier presents a plus or minus fractional power lens before the lens of integral power in the disc. Thus, if a +3.00 lens was found to be too weak and a +4.00 lens too strong, the +3.00 lens would be set in the line of vision of the patient and the segment moved to bring, in succession, the lenses of fractional strength into registration with those of the disc. By this procedure it was attempted to obtain the same optical effect with a +3.00 lens and a superposed +.75 lens, for example, as would be produced by a +3.75 lens. Actually, however, the combined lenses have the effect of a single lens stronger than +3.75.

A further disadvantage in instruments for testing and determining the condition and defects of eyesight resides in the mounting of the circular lenses side by side contacting only at one point, or entirely separating the lenses so that between adjacent lenses there lies a small strip of the opaque material comprising the lens support. Thus, when the instrument is actuated to bring the lenses successively before the patient's eye the continuity of effect is broken by the visual obstructions between the lenses, and a longer time is consumed by the patient who is trying to focus on a distant object with the aid of the lenses as they are successively presented before his line of vision, because the opaque areas between the respective lenses obstruct the vision and prevent a continuous view of the objective.

With circular spherical lenses as have heretofore been used each lens as it passes across the line of vision from its edge to its center must necessarily give to the observer an impression of movement of the viewed object. This movement is false, and to that extent is confusing and undesirable. The movement, known as prismatic displacement or parallex movement, begins at the moment the edge of the approaching lens intersects the line of vision, and continues, but with decreasing speed, as the lens center is approached. When the lens center is reached the movement ceases. While it is impossible to entirely eliminate this disadvantage my invention provides the means for reducing such effect to a minimum, as will hereinafter be more fully described.

One of the objects of my invention is to provide a mounting for spherical optical lenses whereby a sufficient number of lenses can be mounted within a frame or support of convenient size to permit of accurate examination without the necessity of placing more than one spherical lens in the line of vision at any time.

A further object is to provide a lens mounting wherein the lenses lie in abutting relation without intervening opaque framework.

A still further object is to provide lenses of such shape and so mounted that prismatic displacement or parallex movement is reduced to a minimum.

Other and further objects will be apparent from the following description and drawing, in which, Figure 1 is a plan view of an optometer disc with lenses mounted in its periphery in accordance with this invention;

Figure 2 is a section taken along the line 2—2 of Figure 1;

Figure 3 is a sectional view taken along the line 3—3 of Figure 1;

Figure 4 is an enlarged view of a single lens before being mounted;

Figure 5 is a plan view of a skiascope or retinascope stick provided with lenses in accordance with my invention;

Figure 6 is a sectional view taken along the line 6—6 of Figure 5.

Referring more particularly to the drawing:

A circular disc 1 is provided adjacent its periphery with a series of intersecting circular openings 2. As is shown in Figures 2 and 3 these openings are not of uniform diameter from one face of the plate to the other but are so formed that arcuate flanges 3 and 4 are provided upon which the upper and lower edges of the lenses 5 rest.

Each of the lenses 5 is primarily of circular shape but is ground down so that the central portion, only, remains. It may be here stated that it is not necessary to grind circular lenses to the required shape, but the lenses may be initially formed in the shape required, and, without subsequent operations upon them, inserted into the frame or disc in which they are finally and permanently mounted.

In its finished condition each lens has arcuately curved upper and lower edges and straight, substantially parallel side edges which are adapted to contact throughout their length with the corresponding edges of adjacent lenses. With a mounting such as is shown in Figure 1, wherein the lenses are placed in circular series, the side edges of the lenses are not parallel, but are formed as radii of the circle which they define.

In practice, my invention is not restricted to the mounting of lenses in the manner heretofore described in optometers, but may be advantageously employed in the construction of skiascopes or retinascope sticks, and other optical instruments.

Retinascope sticks have heretofore been provided with either positive or negative lenses, but so far as I am aware no previous construction has embodied both positive and negative lenses in one instrument. In their use the examination of the eye is conducted in a dark room, and both positive and negative lenses must be accessible to the examiner, but inasmuch as the separate sets of lenses are mounted in different sticks or holders confusion as to the identity of each, and consequent loss of time is likely to result. Furthermore, retinascope sticks such as are used at the present time have lenses only in steps of integers, as for example, +1.00, +2.00, and +3.00d and −1.00, −2.00, −3.00d, and lenses of fractional power must be superposed upon these in order to obtain results with the necessary degree of accuracy. These supplementary lenses are mounted in a slide which traverses the length of the stick and is adjusted by the occulist when making an examination. By my invention I am enabled to simplify the construction and facilitate the operation of such instruments.

By making the individual lenses of the shape heretofore described I am enabled to mount a sufficient number of them in a stick of moderate and convenient length to permit of accurate examination without the use of auxiliary or supplementary lenses, whereas, as has been pointed out, lenses of fractional power have heretofore been carried by a slide and adjusted to register successively with those of unit power. I am enabled to mount lenses of both fractional and unit diopters side by side in a single frame or stick, and to provide both positive and negative lenses in a single construction. Thus, by the use of my invention it is possible to quickly and precisely determine the strength of lens necessary to correct fault in the vision of the patient.

The stick shown in Figures 5 and 6 of the drawing has lenses 5 mounted in two parallel rows. The lenses of one row are plus lenses while those in the other row are minus in character. In operation, it is only necessary to hold the stick before the eye of the patient and move it to bring the lenses, in succession, before the eye. If for any reason the minus lenses, for example, are presented first and plus lenses are required for the examination it is only necessary to turn the stick over and repeat the single, simple operation.

From the foregoing it will be apparent that I have provided a mounting for lenses to be used in the examination of the eye, which mounting is simple, and inexpensive, and which permits of the mounting of all necessary lenses for examination in a single element without the use of auxiliary or supplementary lens-carrying elements; which eliminates visual disturbances by dispensing with opaque framework between adjacent lenses, and which reduces prismatic displacement or parallex movement to a minimum.

What I claim as my invention is:

1. An instrument for examining the eye comprising a lens support having a plurality of zonoid lenses of different diopter power mounted therein with straight side edges, the side edges of said lenses being in immediate juxtaposition whereby in a support of convenient size a series of optical lenses may be mounted, each lens differing in strength from those adjacent to it by any desired fraction of a diopter.

2. An optical instrument for examining the eye comprising a support formed with a series of intersecting openings for the reception of spherical lenses, a plurality of lenses of different diopter power mounted in the openings provided therefor, said lenses each having straight side edges contacting the corresponding edges of adjacent lenses throughout their length whereby in a support of convenient size and shape a series of optical lenses may be mounted, each lens differing in strength from those adjacent to it by any desired fraction of a diopter.

3. In an optometer or like instrument a lens support, a circular series of lenses mounted in said support in immediate juxtaposition, the side edges of each of said lenses being straight and formed as radii of the circle defined by the series, the abutting lenses of the series differing in strength from those abutting it by any desired fraction of a diopter.

In testimony whereof I affix my signature.

J. BEATY GRIFFITH.